Nov. 10, 1959  WOLF-DIETER BENSINGER ET AL  2,912,031
BOLT HEAD HAVING CIRCUMFERENTIALLY SPACED SERRATIONS
Filed Feb. 14, 1955

INVENTORS
WOLF-DIETER BENSINGER
AND MARTIN FRITZ

BY Dicke and Craig

ATTORNEYS

2,912,031
BOLT HEAD HAVING CIRCUMFERENTIALLY SPACED SERRATIONS

Wolf-Dieter Bensinger, Stuttgart-Unterturkheim, and Martin Fritz, Oberurbach, near Schorndorf, Germany, assignors to Daimler-Benz Aktiengesellschaft, Stuttgart-Unterturkheim, Germany Application February 14, 1955, Serial No. 487,956
Claims priority, application Germany February 13, 1954
1 Claim. (Cl. 151—41.73)

This invention has for its object to provide a bolted connection, particularly for connecting rods, using a simple yet reliable device for securing against rotation the bolt therein employed.

Another object of the invention is to provide, in an anti-rotational locking device making use of a serration that works itself into the wall of a drilled hole as the bolt is inserted into said hole, an arrangement enabling relatively small forces to be used and the connection to be easily unlocked when necessary.

Accordingly, an essential characteristic of the invention is an arrangement in which the bolt is provided with a serration of a somewhat larger major diameter than the diameter of the drilled hole receiving the serration, and in which the serration, preferably provided on the head of the bolt, extends only over part of the circumference of the bolt, particularly over two opposite narrow sectors only.

Another object of the invention is an anti-rotational device adapted particularly for connecting-rod bolts, for instance of automobile engines, and very simple in connection with the manufacture thereof, major notch effects being simultaneously avoided.

According to a further characteristic of the invention, the serration is very finely constructed, the difference between half the outer diameter of the serration and half the diameter of the drilled hole receiving the same being only a fraction of a millimeter, for instance approximately 0.05 mm. to 0.30 mm., particularly 0.10 mm. to 0.15 mm. if the maximum depth of serration is approximately 0.2 mm.

Further objects and features of the invention will become evident from the following description and the accompanying drawings which show an embodiment of the invention in which.

Figure 1:
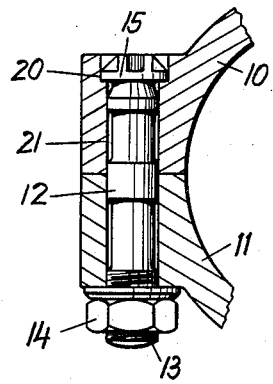
Fig. 1 is a sectional view of the bolted connection as applied to a connecting rod.
Figure 2:
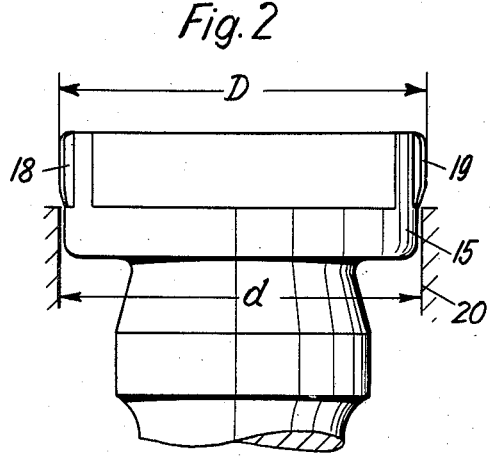
Fig. 2 is an enlarged view of the head of the serrated bolt.
Figure 3:
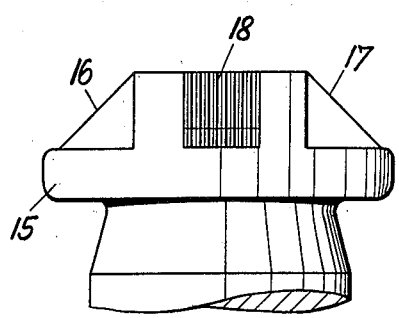
Fig. 3 is a view displaced by 90° in relation to Fig. 2.
Figure 4:
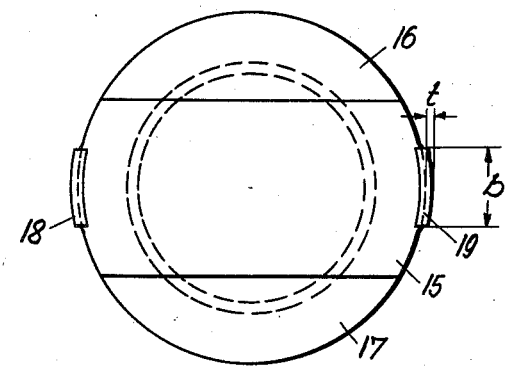
Fig. 4 is a plan view of the bolt head according to Fig. 2.
Figure 5:
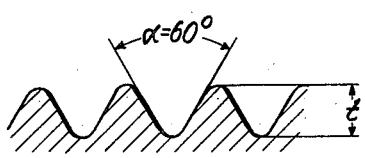
Fig. 5 is a cross sectional view of the serration on a still larger scale.

The connecting rod 10 and the connecting rod cap 11 are connected together by a bolt 12. The bolt 12 is provided at one end with a thread 13 to receive a nut 14 and at the other end with a head 15 which as shown particularly in Figs. 3 and 4 has roof-like flats on two opposite sides at 16 and 17 and serrations 18 and 19, respectively, at points staggered thereto by 90°. These serrations extend over a comparatively small section of the circumference only, viz, over a width $b$ of, for instance, 3 mm., the depth $t$ of the serration (Figs. 4 and 5) being approximately 0.2 mm. and the serration angle, 60°.

The major diameter D of the serration is slightly larger than the diameter $d$ of the drilled hole 20 in the connection-rod section 10 receiving the head 15 provided with the serration 18. The difference between half diameter D and half the diameter $d$ is approximately 0.10 mm. to 0.15 mm.

The bolt head further comprises parts of the part-cylindrical formation circumferentially bounding the serrated sectors 18 and 19. These are useful as guiding means for the bolt during installation thereto but their circumferential extent and thus their weight is limited by the provision of the beveled portions 16 and 17 referred to above which space these parts. In this way, a light-weight construction is attained which is a particularly desirable advantage in the use of the bolt for the fastening of moving parts such as connecting rod bearings for which purpose applicants' bolted connection is especially suitable.

When pulling the bolt 12 into the drilled hole 21 by turning the nut on its thread 13, therefore, the serration 18 will work itself into the hole 20 thereby securing the connecting bolt 12 against rotation. The head is provided with guiding and seating means comprised by the cylindrical formation indicated by reference numeral 15 and by the smooth part-cylindrical portions adjacent serrations 18 in a circumferential direction.

What we claim is:

In a connecting rod having two bearing members adapted to receive the crank member of a crankshaft, a bore in one of said members, two bores in the other of said members, all of said bores being coaxial, the outermost of said two bores being of greater diameter than the other bores, and a shoulder between said two bores, means for fastening said members together comprising a bolt adapted to extend through said bores and having a shank portion closely fitting a bore in each of said members at least adjacent their junction, means on said bolt cooperating with one of said members for applying endwise pressure on said bolt in a drawing operation for drawing said bolt through said bores into a position in which said members are securely fastened together, said bolt having a head, said head being seated against the said shoulder when said bolt is in said position, means facilitating said drawing operation, said means being constituted by the relative proportions and dispositions of two sets of parts of said head, one of said sets comprising a total of only two oppositely disposed, arcuate, narrow bands of serrations, said serrations having a major diameter greater than that of the said outermost of said bores, the other of said two sets comprising two oppositely disposed portions spacing said bands and including parts spaced radially from the wall of said outermost bore, and the combined circumferential extent of said portions being substantially greater than the combined circumferential extent of the said bands of serrations, said serrations working into the wall of said outermost bore during said drawing operation and preventing a turning movement of said bolt when said bolt is in said position, said head being provided with a smooth cylindrical portion bounding said bands of serrations in an axial direction toward said shank, said smooth cylindrical portion making guiding contact with said outermost bore during said drawing operation.

References Cited in the file of this patent

UNITED STATES PATENTS

| | | |
|---|---|---|
| 1,779,805 | Dunwoodie | Oct. 28, 1930 |
| 1,803,317 | Brown | May 5, 1931 |
| 2,133,465 | Purtell | Oct. 18, 1938 |
| 2,401,967 | Sandberg | June 11, 1946 |
| 2,411,364 | Butterfield | Nov. 19, 1946 |
| 2,544,304 | Eckenbeck et al. | Mar. 6, 1951 |
| 2,548,840 | Eksergian | Apr. 10, 1951 |
| 2,642,242 | Karitzky | June 16, 1953 |
| 2,685,320 | Rosan | Aug. 3, 1954 |

FOREIGN PATENTS

| | | |
|---|---|---|
| 133,093 | Great Britain | Oct. 9, 1919 |
| 1,008,460 | France | Feb. 20, 1952 |